United States Patent
Peng et al.

(10) Patent No.: US 11,507,164 B2
(45) Date of Patent: Nov. 22, 2022

(54) SYSTEMS AND METHODS FOR FLEXIBLE MOTHERBOARD SUPPORTING FLEXIBLE PROCESSOR UTILIZATION FOR OPTIMIZED DESIGN

(71) Applicant: Dell Products, LP, Round Rock, TX (US)

(72) Inventors: Sam Cn Peng, Zhonghe Dist. (TW); Alex Fc Chang, Taipei (TW); Morris Su, Hsinchu (TW)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 17/076,720

(22) Filed: Oct. 21, 2020

(65) Prior Publication Data
US 2022/0121259 A1    Apr. 21, 2022

(51) Int. Cl.
*G06F 1/28* (2006.01)
*G06F 13/40* (2006.01)
*G06F 13/20* (2006.01)

(52) U.S. Cl.
CPC ............ *G06F 1/28* (2013.01); *G06F 13/20* (2013.01); *G06F 13/4022* (2013.01)

(58) Field of Classification Search
CPC ...... H02M 3/1584; H02M 1/008; H02J 1/001; G06F 1/26; G06F 1/3296; G06F 2119/06; G06F 1/3203; G06F 1/28; G06F 13/20; G06F 13/4022; Y02D 10/00
USPC ......... 713/320, 300, 324, 323, 340; 323/282
See application file for complete search history.

(56) References Cited

U.S. PATENT DOCUMENTS

| | | | |
|---|---|---|---|
| 6,147,908 A * | 11/2000 | Abugharbieh | G11C 16/30 365/185.28 |
| 8,051,307 B2 * | 11/2011 | Huang | G06F 1/3243 713/300 |
| 8,289,739 B2 | 10/2012 | Wilson | |
| 8,539,269 B2 * | 9/2013 | Rotem | G06F 11/3058 713/320 |
| 10,019,021 B1 | 7/2018 | Lee | |
| 10,218,129 B1 | 2/2019 | Mondal | |
| 11,023,024 B1 * | 6/2021 | Chen | G06F 13/4282 |
| 11,383,599 B2 * | 7/2022 | Dumas | B60K 17/02 |
| 2004/0117673 A1 * | 6/2004 | Arabi | G06F 1/26 713/300 |
| 2005/0127942 A1 * | 6/2005 | Smith | H03K 19/177 326/38 |

(Continued)

*Primary Examiner* — Faisal M Zaman
(74) *Attorney, Agent, or Firm* — Prol Intellectual Property Law, PLLC; H. Kenneth Prol

(57) ABSTRACT

An information handling system may include a processor; a memory; a voltage regulator module (VRM) coupled to the processer and a power source; an embedded controller (EC) operatively coupled to the VRM; the power source to provide power to the processor based on the type of processor detected, memory, and EC; and the EC being operatively coupled to a switch that is operatively coupled to a resistor divider circuit for setting a load line resistance level to the VRM; and the EC and to transmit a signal to the switch to set a load line resistance level provided to the VRM, via adjustment to the resistor divider circuit, the adjustment based on power requirements of the type of processor installed as detected by a basic input/output system (BIOS).

20 Claims, 4 Drawing Sheets

(56) References Cited

U.S. PATENT DOCUMENTS

| | | | |
|---|---|---|---|
| 2006/0179379 A1* | 8/2006 | Ke | G06F 11/00 714/E11.018 |
| 2007/0229149 A1* | 10/2007 | Pan | H02M 3/073 327/543 |
| 2007/0260899 A1* | 11/2007 | Burton | G06F 1/26 713/300 |
| 2007/0262132 A1* | 11/2007 | Burton | G06F 1/26 235/375 |
| 2008/0244294 A1* | 10/2008 | Allarey | G06F 1/3296 713/320 |
| 2009/0249092 A1* | 10/2009 | Lam | G06F 1/26 713/310 |
| 2009/0319809 A1* | 12/2009 | Shi | G06F 1/26 713/300 |
| 2010/0237838 A1* | 9/2010 | Templeton | H02M 3/1588 323/271 |
| 2012/0010536 A1 | 5/2012 | Kremin | |
| 2012/0267954 A1* | 10/2012 | Yang | G06F 1/28 307/31 |
| 2013/0234691 A1* | 9/2013 | Carroll | H02M 3/1588 323/283 |
| 2014/0152278 A1* | 6/2014 | Shepard | G06F 1/04 323/272 |
| 2015/0095010 A1* | 4/2015 | Brock | G06F 30/367 703/21 |
| 2016/0299555 A1* | 10/2016 | Rucker | H05B 47/185 |
| 2017/0168534 A1* | 6/2017 | Lefurgy | G06F 1/206 |
| 2020/0088793 A1 | 3/2020 | Montero | |

\* cited by examiner

SYSTEMS AND METHODS FOR FLEXIBLE MOTHERBOARD SUPPORTING FLEXIBLE PROCESSOR UTILIZATION FOR OPTIMIZED DESIGN

FIELD OF THE DISCLOSURE

The present disclosure generally relates to flexible motherboard and power system design in support of plural processor types used with an information handling system. The present disclosure more specifically relates to an analog switching system for changing load line settings provided to a processor based on detected processor type.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, information handling system models may include multiple options for processor types which may vary depending upon features selected by a purchaser for an information handling system build or for repairing or upgrading an information handling system. The cost of altering or designing differing motherboards to accommodate varying processor types may contribute to an increased cost of the information handling system or of a repair or upgrade.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
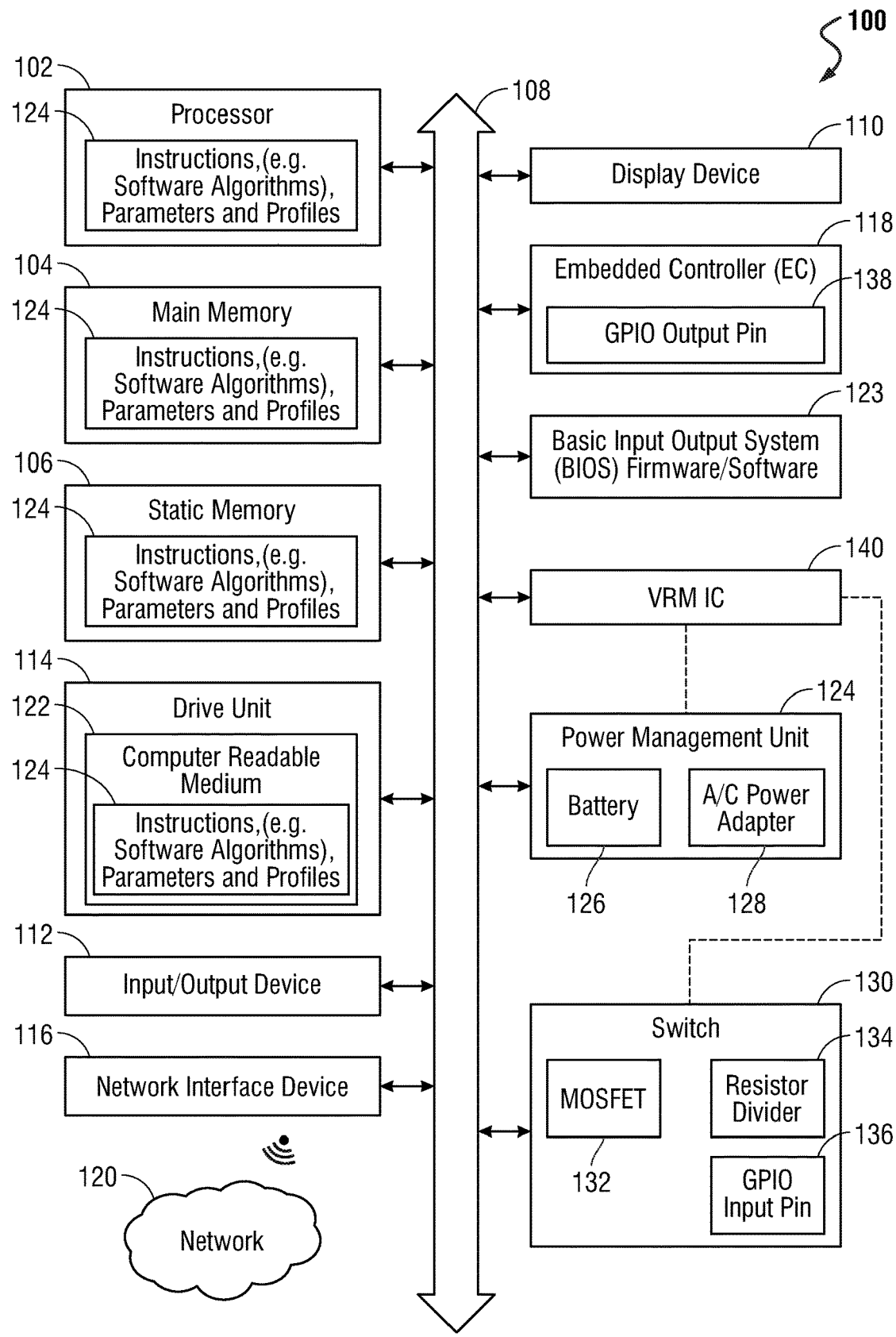
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provide for a method and system for changing a load line setting to be associated with the regulation of power to be provided to a processor, such as a central processing unit (CPU) installed in an information handling system. The method and systems of embodiments herein allow for more than one type of processor to be used with a flexible motherboard during manufacture of an information handling system that may optionally use one or more processor types. For example, an information handling system may have selectable processor options for customizability of an information handling system build where the processor options may have differing power and voltage operational specifications. Similarly, an information handling system of the present embodiments may have a motherboard design that may accommodate a current generation of processor and anticipate release of a future generation processor and accommodate different power and operational specification as they change between processor generations. In yet other aspects, an information handling system may have a number of hardware parts replaced in order to achieve better performance or for the replacement of a defective part. One such hardware part may be the processor.

In an embodiment where a processor is upgraded or swapped out for a new processor, the power requirements for the new processor may similarly change. A load line setting or specification may be defined respectively for different CPU power levels and core count based on design guidelines associated with each type of processor installed. During operation of the processor, a pulse width modulation (PWM) power integrated circuit (IC) may be implemented to modulate the power provided to the processor. The PWM power IC may include a voltage regulator module (VRM) that, when the processor moves from an idle state to a loaded state, the PWM controls the VRM to provide the power necessary to drive the processor. However, the VRM may not be capable of providing enough energy to maintain the voltage according to a predefined load line setting thereby causing a voltage drop at the processor. This may yield inefficient operation of a CPU provided regulated power from the VRM unless a load line adjustment is made on the motherboard. To prevent this, most digitally driven PWMs have a feedback module that senses the voltage and current used at the processor at any given time and allows the VRM to digitally compensate for the drop in voltage by adjusting, for example, the duty cycle. However, with a digitally driven VRM, the load line cannot be easily changed among different "generations" of types of processors or substantially different processor specifications. Indeed, in some cases the bill of materials (BOM) having a first level generation processor (per a first load line setting) may be different than the BOM specifying the second level generation (or higher levels) processor (per a second load line setting) which although not available yet, specifications may be released in anticipation of motherboard development. This means, that with a digitally driven VRM, switching from a first type of processor to a second type of processor may further necessitate a new motherboard (MB) configuration or the VRM is incapable of some level of adjustment.

In some examples, an analog multiphase PWM power IC design may be implemented. With this analog multiphase PWM power IC design, a load line setting is implemented by using external resistors. Such a solution may be very cost effective. However, that may also cause possible BOM changes or rework actions in order to support different generation processor power levels on a single motherboard when the load line specifications are different between each processor. Such a motherboard redesign or alteration undertaking may be quite expensive to accommodate CPU generation changes or for offering multiple processor options. The present systems and methods provide for a switched system that allows for the analog adjustment of the load line levels pursuant to specific load line settings suited for a processor and a VRM providing regulated power to the processor. Such load line settings may be switched by an embedded controller (EC) in embodiments of the present disclosure and correlate load line settings for each type of processor detected.

Specifically, the present systems and methods provide for a basic input/output system (BIOS) of an information handling system that uses, for example, an IA32 CPUID instruction set to retrieve information to identify the installed processor (e.g., including data on generation or processor type that may be correlated to load line settings) attached on the motherboard. The system and methods further allow for the BIOS to communicate the identity of the installed processor type to the EC to set a new load line level by controlling an external switch that includes a modifiable resistor divider capable of being operatively coupled to a third resistor, or even additional resistors, to adjust the characteristics of the load line setting to the VRM power IC. In this way, the flexible motherboard of the embodiments herein may accommodate the load line values to support regulated power, voltage and current levels regulated by the VRM and according to the specified levels of the processor detected as installed. This allows a manufacturer to build a motherboard and other parts of an information handling system in preparation for a purchaser to customize that build. The customer may customize the initial build by selecting one of a plurality of different types of processors or even a type of processor (e.g., next generation processor) not available on the market at the time of the initial build by the manufacturer if the load line specification of the upcoming generation is known, for example.

The present specification describes an information handling system including a processor; a memory; an embedded controller (EC) operatively coupled to a VRM and the processor; a power source to provide power to the first type of processor, memory, and EC; and a switch, operatively coupled with the VRM to the EC and a modifiable resistor divider circuit. The switch may include a metal-oxide-semiconductor field-effect transistor (MOSFET) operatively coupled to the resistor divider to switch the load line resistance levels to the VRM and, thus the VRM regulated power under load to the first type of processor. The switch may include a general-purpose input/output (GPIO) input pin operatively coupled to the GPIO output pin of the EC to receive a signal from the EC to switch a load line level provided based a type of processor detected and based on power requirements of the detected processor. In an embodiment, the information handling system includes a basic input/output system (BIOS) to identify a processor type, via an IA32 CPUID instruction set, and provide this identity to the EC. The EC may then define the load line setting to be associated with that identified processor type and output the GPIO signal for the switch to control one of the first or second load line levels into the VRM. The first type of processor may be operated at a first load line setting or specification in accordance to VRM voltage and power regulation to that processor type. When a second type of processor type is detected, a second load line setting may be necessary to operate the second type of processor with regulate power from the VRM according to its different specification. In an embodiment, the VRM may be placed between the installed processor and the switch to set the regulated power levels to the detected processor as partially determined by the load line resistor setting established by the switchable resistor divider circuit. The switchable resistor divider circuit may, for example, be switched between a default load line level or reset to a second load line resistance level according to the operation of the switchable resistor divider and switch.

In an embodiment, the information handling system may further comprise a third resistor operatively coupled to the switch that may be actuated to adjust the load line setting associated with the second type of processor type detected by the BIOS of the information handling system. While the load line setting associated with a first type of processor type may be described herein as a "default" load line, the load line setting may be switched to a second load line setting associated with a second detected processor type, where different VRM operational specifications may be involved. This may be referred to herein as a secondary load line setting. It is understood that load line levels relate to resistance of power line input to the VRM which may alter the regulated power levels or ranges of voltage or current provided by the VRM to the processor under varying load conditions including during high load operation, invoking multiple cores, overclocking operation, or during middle or lower processor load conditions. Further, it is contemplated that a switch, such as plural MOSFETs, may be used to actuate a fourth or other resistors of different values for further flexibility of adjusting to plural load line resistance levels to accommodate more than two types of processors with different operation specifications.

In an embodiment, during operation of the information handling system, the signal from the EC to reset the load line levels and thus the regulated power level accommodated under varying load conditions and directed by the VRM that is placed intermediary to the processor and the switch may also require the processor and VRM to be powered down to avoid possible damage to the processor. When the load line setting is to be changed, the EC may review a table describing a load line setting to be associated with the second type of processor and direct the EC to set the load line resistance levels impacting the regulated VRM power levels accommodated under load. The load line levels may be provided by switching the switchable resistor divider circuit according to the load line setting associated with the detected processor. As described, embodiments herein contemplate more than two possible load line levels may be set by the EC via a switchable resistor divider circuit.

A method of resetting a power supply to a processor of an information handling system is also described herein. The method may include initiating power at the information handling system; with the execution of a basic input/output system (BIOS) by a processor, detecting the type of the processor within the information handling system; accessing a table maintained on a memory to determine a load line specification associated with the detected processor type; executing the BIOS to communicate with an embedded controller (EC) the type of detected processor or the determined load line level for the detected processor; the EC providing general-purpose input/output (GPIO) output to a switch, the switch as including a switchable resistor divider circuit used to set the load line resistance level provided to the detected processor via a voltage regulator module (VRM).

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU) (e.g., processor 102), a graphics processing unit (GPU), hardware or software control logic, or any combination thereof. Additional components of the information handling system 100 can include one or more storage devices, one or more communications ports for communicating with external devices, as well as, various input and output (I/O) devices, such as a keyboard, a mouse, a video/graphic display, or any combination thereof. The information handling system 100 can also include one or more buses 108 operable to transmit communications between the various hardware components. Portions of an information handling system 100 may themselves be considered information handling systems 100.

Information handling system 100 can include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 such as the basic input/output system firmware/software (BIOS FW/SW) 123 for operation of the embedded controller (EC) 118 and the switch 130 as described herein, and drive unit 114 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices 112, the EC 118, the switch 130, and a power management unit (PMU) 124.

The information handling system 100 may further include a display device 110. The display device 110 in an embodiment may function as a liquid crystal display (LCD), an organic light emitting diode (OLED), a flat panel display, or a solid-state display. Additionally, the information handling system 100 may include an input/output device 112, such as a cursor control device (e.g., mouse, touchpad, or gesture or touch screen input) or a keyboard. The information handling system 100 can also include a disk drive unit 114 including, for example, one or more types of data storage medium.

The network interface device (NID) 116 as shown may provide connectivity to a network 120, e.g., a wide area network (WAN), a local area network (LAN), wireless local area network (WLAN), a wireless personal area network (WPAN), a wireless wide area network (WWAN), or other networks. Connectivity may be via wired or wireless connection. The NID 116 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one NID 116 may operate two or more wireless links.

The NID 116 may connect to any combination of macrocellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, 1700/2100 MHz, in a 5G FR1 band of below 6 GHz, or a 5G FR 2 band in the mm-wave range (e.g., above 6 GHz or 24-100 GHz) for example as well.

In some embodiments, software, firmware, dedicated hardware implementations such as application specific integrated circuits, programmable logic arrays and other hardware devices can be constructed to implement one or more of some systems and methods described herein. For example, EC 118 may execute instructions in firmware, hardware or software separately or along with a processor executing BIOS instructions to execute some or all parts of the systems and methods described in embodiments herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include software, including firmware embedded at a device, such as an Intel® Core class processor, ARM® brand processors, Qualcomm® Snapdragon processors, or other processors and chipsets, an embedded controller or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

The present disclosure contemplates a computer-readable medium that includes instructions, parameters, and profiles 124 or receives and executes instructions, parameters, and profiles 124 responsive to a propagated signal, so that a device connected to a network 120 can communicate voice, video or data over the network 120. Further, the instructions 124 may be transmitted or received over the network 120 via the network interface device 116.

The information handling system 100 can include a set of instructions 124 that can be executed to cause the computer system to perform any one or more of the methods or computer-based functions disclosed herein. For example, instructions 124 may execute software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 114 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including an estimated training duration table. The disk drive unit 114 and static memory 106 may also contain space for data storage. Further, the instructions 124 may embody one or more of the methods or logic as described herein. For example, instructions relating to any software algorithms, processes, and/or methods may be stored here. In a particular embodiment, the instructions, parameters, and profiles 124 may reside completely, or at least partially, within the main memory 104, the static memory 106, and/or within the disk drive 114 during execution by the processor 102 of information handling system 100. As explained, some or all of the instructions, parameters, and profiles 124 may be executed locally or remotely. The main memory 104 and the processor 102 also may include computer-readable media.

Main memory 104 may contain computer-readable medium (not shown). An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The BIOS FW/SW 123, for example, may be stored in static memory 106, or the drive unit 114 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may further include a power management unit (PMU) 124 which may include or interface with a power supply unit (PSU). The PMU 124 may manage the power provided from a power supply unit that may include power supply sources such as a power adapter 128 for A/C power or a battery 126 to the components of the information handling system 100 such as the processor 102, a cooling system such as a fan, one or more drive units 114, the EC 118, the display device 110, the VRM integrated circuit 140 and other components that may require power when a power button has been actuated by a user. In an embodiment, the PMU 124 may be electrically coupled to the bus 108 to provide data communications related to the control and supply of this power. The PMU 124 may regulate power from a power source such as a battery 126 and A/C power adapter 128. In an embodiment, the battery 126 may be charged via the A/C power adapter 128 and provide power the to the components of the information handling system 100 when A/C power from the A/C power adapter 128 is removed. Power may be supplied to various components of the information handling system via power rails of the information handling system.

In an embodiment, the information handling system may include an embedded controller (EC) 118. The EC 118 may interact with the components of the information handling system 100 at any time either before or after the loading of the BIOS FW/SW 123 in order to execute the processes described herein. These components may include any components that are used herein in order to properly set a load line setting for the processor 102 coupled to a motherboard within the information handling system 100. In an embodiment, the EC 118 may be responsible for, among other tasks, detecting the initiation of power at the information handling system 100 and receiving, via execution of the BIOS FW/SW 123, information related to the type of processor 102 installed in the information handling system 100. During execution of the present embodiments described herein, the EC 118 may receive this information and determine a load line setting for the operation of the processor 102 based on the installed type of processor 102 detected. As described herein, a processor 102 may be mounted on a motherboard within the information handling system 100 that requires specific power requirements defined by a specific load line setting or specifications and operation of the VRM for the processor. A load line setting is a resistance level that adjusts voltage and current setting provided to a VRM circuit for a regulated range of current and voltage settings for controlled limitation of power draw during varying load levels for operation of the processor 102 describing the possible operating point(s) (Q points) of the circuits if the processor 102 such that, at these Q points, the current and voltage parameters of both parts of the circuit match. This load line setting may be specific to any type of processor installed within the information handling system 100. When the EC 118 is informed of which type of processor 102 is installed within the information handling system 100, the EC 118 may access a table, according to an example embodiment, that defines the load line setting for that specific type of processor. In a specific embodiment, the EC 118 may set a default load line setting for the processor 102 installed during manufacturing of the information handling system 100 while a different load line setting may be set for a processor 102 that has replaced a previous generation processor used with the motherboard as the information handling system 100 model evolves. Additionally, during a repair or upgrade, an old, obsolete, or damaged processor may be replaced with a different processor in the same motherboard even with an adjustment to load line levels to achieve optimized performance of the replacement processor.

In some embodiments, the one or more processor 102 options may be installed in the information handling system 100 such that a first type of processor or a second type of processor may be selected for an information handling system build. The selection between a first type of processor type and a second type of processor type for processor 102 (e.g., factory installed) may be done in an attempt to upgrade the processing capabilities of the information handling system 100 or a replacement may be made in order to replace the originally installed processor 102 for repair or upgrade. Alternatively, the information handling system 100 may include a plurality of processors 102 (e.g., a multiprocessing system) or multiprocessing cores may be utilized that each may be selectively activated or deactivated in order to accomplish certain processing tasks. In these embodiments, based on the tasks to be accomplished, one of the multiple processors or processing cores may be selected as the control processor over the other processors or processor cores. The load line setting associated with any of these alternative processor configurations may be different from other type of processor configurations and the EC 118 and VRM 140 may control how power is provided to these various processor configuration in accordance with various embodiments described herein.

In order to accomplish flexibility to load line settings for varying processor types with a motherboard, the EC 118 may, after determining the load line setting with the detected processor 102, send a signal to a switch 130 to operatively switch configuration of a coupled, switchable resistor divider circuit 134. The signal may direct the switch 130 to, based on the load line setting, either maintain the load line levels (e.g., based on current or default resistor divider 134 architecture) provided to the VRM 140 and processor 102 or cause the switch 130 to access another resistor in order to change or augment the resistor divider circuit 134 and, therefore, change the load line resistance level to the VRM 140 and the characteristics of the regulated power provided to the detected processor 102 via the VRM 140. In a specific embodiment, resistor divider 134 may include two resistors in a first architecture to provide a default load line level (a.k.a. "LL Config-1") to the VRM 140 for processor 102. In another specific embodiment, the switch 130 may selectively, operatively couple the resistor divider 134 to a third resistor in order to provide a secondary load line level (a.k.a. "LL Config-2") to the processor 102. In an embodiment, the switch 130 may only make changes the load line resistance levels of the switchable resistor divider 134 when instructed to do so by the EC 118.

The switch 130 and EC 118 may communicate via a general-purpose input/output (GPIO) output pin 138 at the EC 118 and a GPIO input pin 136 at the switch 130 in an embodiment. During operation, the signal (e.g., GPIO signal) sent from the EC 118 to the switch 130 to either maintain a specific load line level or change the load line level may be binary with a "0" signal being a first load line configuration setting such as the default load line setting described herein and a "1" being a second load line configuration setting such as the secondary load line setting. In a specific embodiment, the switch 130 may include a metal-oxide-semiconductor field-effect transistor (MOSFET) 132 that receives the GPIO signal from the EC 118. It is appreciated that the switchable resistor divider 134 operatively coupled to the switch 130 may include any number or combinations of resistors used to provide to the VRM 140 a load line level for regulating a plurality of regulated power levels to the processor 102. For example, the switchable resistor divider 134 may use more than three resistors or plural switches and it is further contemplated such switchable resistor divider architecture may be used in order to provide additional potential load line settings to one of a variety of detected processor types.

The information handling system 100 may include, in embodiments, a voltage regulator module (VRM) 140 that may be operably connected to the bus 108 and the switch 130. The VRM may be placed intermediated to the switch 130 and the processor 102. In an embodiment, the VRM may further adjust and regulate the power supplied to the processor in order to perform overclocking processes and compensate for high and low voltage fluctuations that may occur during operation of the processor 102 within a specification for the type of processor installed. In a specific embodiment, the VRM may be a VRM produced by ON Semiconductors®.

During operation of the information handling system 100, a user may actuate a power button in order to cause the BIOS FW/SW 123 to be booted. During booting of the BIOS FW/SW 123, the processor 102 may cause the BIOS FW/SW 123 receive data identifying the processor type installed and to provide that information to the EC 118 describing the type of the processor 102 currently installed within the information handling system 100. The BIOS FW/SW 123 may receive this information from the processor 102 and provide it to the EC 118 via, for example, a serial peripheral interface (SPI) or similar data transmission interfaces. In an embodiment, the BIOS FW/SW 123 may use, for example, Intel® Architecture, 32-bit instruction set architecture to get the attached processor 102 information so as to identify which type of processor is attached and provide that information to the EC 118.

In a specific embodiment, the information may include the generation of the processor 102, number of cores within the processor (where applicable), a number of available threads of the processor 102, and a stock keeping unit (SKU) associated with the processor 102, among other identification data. This information may be used by the EC 118 to determine whether the currently set load line setting should be maintained, or whether that load line should be changed. In an embodiment, the EC 118 may be provided with access to a look-up table stored on a memory device (e.g., 104, 106, 114) or a memory specific to EC 118 that cross-references the information related to the currently-installed processor 102 with a load line setting associated with the operation of that processor 102.

With this information the EC 118 may define a GPIO output to the switch 130. In a specific embodiment, the switch 130 may be placed in an "off" state such that a default load line setting is maintained. In this "off" state, the switch 130 causes a first resistor and a second resistor to be implemented as the resistor divider 134 in order to provide a default or first load line resistance level to the VRM 140 to maintain specified regulated power levels to processor 102 from a power supply. The EC 118 may also direct the switch 130 to be placed in an "on" state. In this "on" state, the switch 130 causes any combination of the first resistor, second resistor, and a third resistor to be implemented as the resistor divider 134. For example, where the third resistor is made to be placed in series with the first resistor and in parallel with the second resistor, load line resistance level to the VRM 140 may be adjusted. This adjustment may adjust the regulated power level and the voltage supplied by the VRM 140 to the processor 102 in accordance with operational specification of the new type of processor 102 detected by the BIOS. Other switchable resistor divider 134 architectures are contemplated such that the switch 130 may provide one or more alternate load line resistance levels to the VRM 140 for regulation of power levels to the processor 102 in one or more "on" states.

When the EC 118 has determined that the processor 102 detected by the BIOS FW/SW 123 is new and the load line setting currently set at the switch 130 should be reset, the EC 118 may cause the power to be removed from components of the system such as the new processor 102 and the VRM. After power down, the EC 118 may send the appropriate signal to the switch 130 to change the load line settings accordingly to switch to either an on state or an off state (or select among plural states as described in embodiments herein). In an embodiment, the EC 118 may cause a reboot to be initiated in order to allow the new load line settings caused by the switch 130 to be reset and applied to the VRM 140 and new processor 102.

Figure 2:
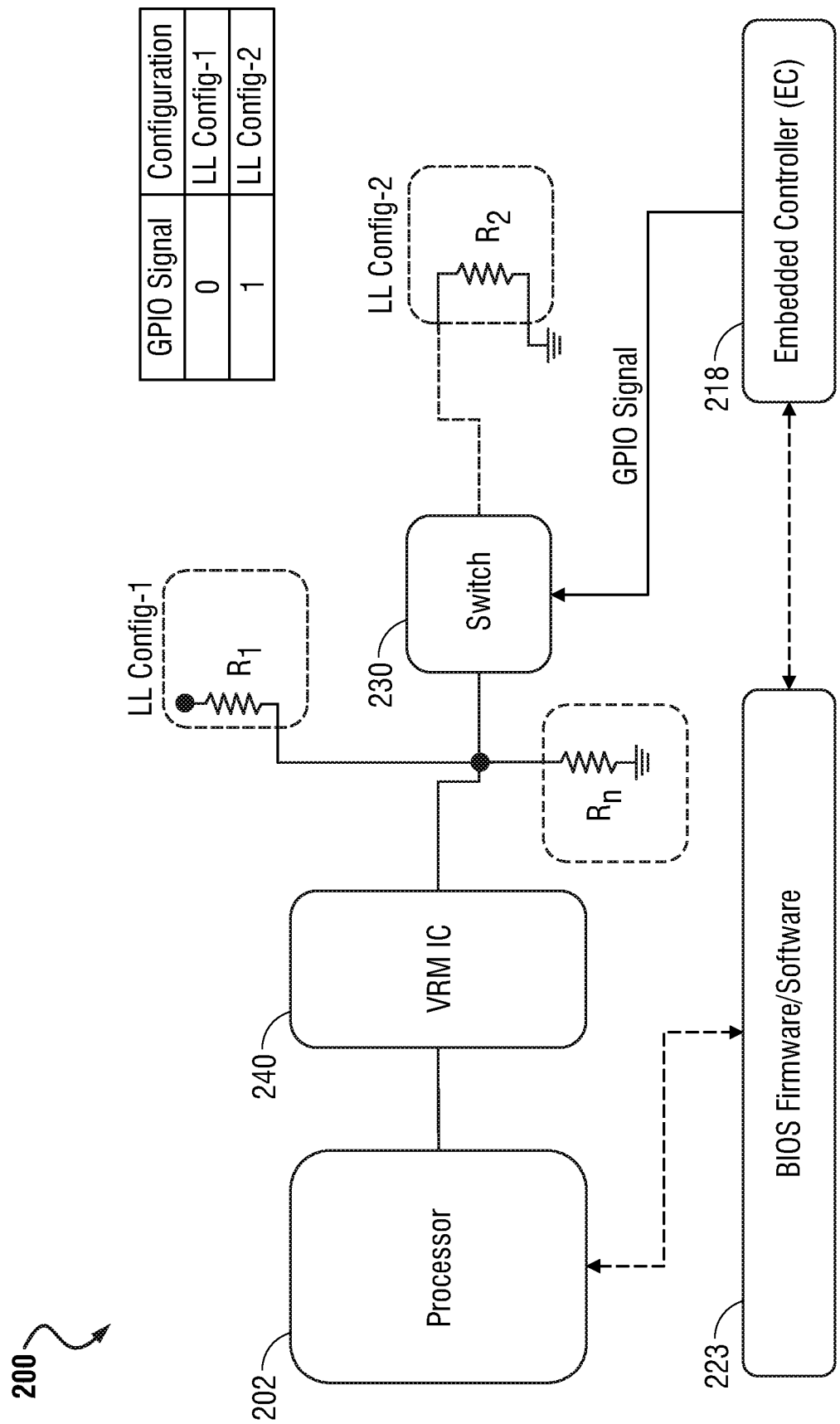
FIG. 2 is a block diagram illustrating a flexible motherboard with adaptable processor load line settings for use with an information handling system according to an embodiment of the present disclosure.

FIG. 2 is a block diagram illustrating operations of an information handling system 200 according to an embodiment of the present disclosure. The information handling system 200 may include similar components as those described in connection with FIG. 1. Specifically, the information handling system 200 may include a processor 202 such as a central processing unit (CPU), control logic or some combination of the same. Any of the processing resources may operate to execute code that is either firmware or software code such as the BIOS firmware/software (FW/SW) 223.

Again, the processor 202 may be, at boot-up of the information handling system 200, an originally-installed processor 202 that the BIOS FW/SW 223 recognizes. For example, the BIOS FW/SW 223 may receive a "CPU ID" from an installed processor 202 upon boot up. The execution of the BIOS FW/SW informs the EC 218 of the information related to the originally-installed processor 202. When the load line setting associated with the originally-installed processor 202 is the same as the currently set (default) load line setting at the switch 230, the EC 118 may send a GPIO signal to the switch 130 indicating that, in this embodiment, that "LL Config-1" is to be set. "LL Config-1" defines which resistors within the resistor divider (e.g., $R_1$ and $R_n$ in series)

are to be used to maintain this "default" load line setting. In this embodiment, the EC 118 may send a "0" signal to the switch 130 in order to set/maintain the resistor divider appropriately as described. At this point, in an embodiment, the information handling system 200 may be allowed to complete any booting processes, if necessary, and the user may begin to operate the information handling system 200.

In the embodiment shown in FIG. 2, the information handling system 200 further includes a VRM IC 240. The VRM IC 240 may be placed intermediated to the switch 230 and the processor 202. The VRM may further adjust the power supplied to the processor in order to perform overclocking processes and compensate for high and low voltage fluctuations that may occur during operation of the processor 202. In an embodiment, the VRM IC 240, the switch 230, and the resistor divider (e.g., $R_1$, $R_2$, and $R_n$) may be formed into a single PWM system formed on a motherboard of the information handling system 200.

Upon execution of the BIOS FW/SW 223, the EC 218 may be provided with information related to a processor 202 that is a different, originally-installed processor 202, or has been changed from the originally-installed processor 202. The BIOS FW/SW 223 may access the processor and receive identification of the new processor 202 installed there. In this case, the EC 218 may access data at a look-up table, for example, that identifies the type of processor 202 installed as well as an operating load line setting to be set at the switch 230. In an embodiment, the secondary load line setting (e.g., "LL Config-2") may be set by the EC 218 sending a GPIO signal to the switch 230 as described herein. The GPIO signal may be a "1" signal that sets the resistor divider appropriately to a secondary configuration (e.g., "LL Config-2").

The operation of the switch 230 includes adjusting the number and/or type of the resistors operatively coupled to the switch 230 at the resistor divider (e.g., $R_1$, $R_2$, and $R_n$). Again, in the specific embodiment shown in FIG. 2, the switch 230 may be placed in an "off" state such that a default load line setting is maintained by the EC 218 in a default state corresponding to one type of processor 202. In this "off" state, the switch 230 causes a first resistor (e.g., $R_1$) and a second resistor (e.g., $R_n$) to be implemented as the resistor divider in order to provide a power level at the VRM IC 240 and to the processor 202. The EC 218 may also direct the switch 230 to be placed in an "on" state. In this "on" state, the switch 230 causes a combination of the first resistor (e.g., $R_1$), second resistor (e.g., $R_n$), and a third resistor (e.g., $R_3$) to be implemented as the resistor divider. For example, where the third resistor (e.g., $R_3$) is made to be placed serially with the first (e.g., $R_1$) and second (e.g., $R_n$) resistor, the voltage supplied at the VRM IC 240 to the processor 202 may be reduced. Similarly, the third resistor (e.g., $R_3$) may be placed in parallel with the second resistor (e.g., $R_n$).

In the embodiment where a second type of processor 202 has been detected as installed and the load line setting currently set at the switch 230 should be reset, the EC 218 may cause the power to be removed from components of the system such as the new processor 202 and the VRM IC 240. After power has been removed from the processor 202 and the VRM 240, the EC 218 may send the appropriate signal to the switch 230 to change the load line settings accordingly (e.g., GPIO signal "1," "LL Config-2"). In an embodiment, the EC 218 may cause a reboot to be initiated in order to allow the new load line settings at the switch 230 to reset and applied to the new processor 202.

The analog switch 230 with its resistor divider (e.g., $R_1$, $R_2$, and $R_n$) provides for a flexible load line setting on a single printed circuit board (PCB) (e.g., the motherboard) that supports different load line settings without modification of the BOM on the motherboard or complete replacement of the motherboard when an originally-installed processor is replaced by a new processor driving manufacture of the information handling system or even during a repair or upgrade. This design of the analog switch 230 that supports at least two different load line settings, therefore, allows for the user to swap out the processor without requiring the manufacturer to develop a new or modified motherboard for an inappropriate load line setting and power supply to the processor by the VRM. The VRM IC's 240 load line adjustment functions may be implemented without significant added cost during the manufacture of the motherboard and other components of the information handling system 200.

Table 1 describes a comparison of performance of aspects of the processor according to the present specification in comparison to a processor that is not communicatively coupled to the switch 230 and resistor divider (e.g., $R_1$, $R_2$, and $R_n$) as shown and described in connection with FIG. 2 by comparing columns 3 and 4.

TABLE 1

|  | Current | Processor Drop-In | MB BOM Change |
|---|---|---|---|
| MB Processor | D9 CFL-S 6 + 2 | D9 CFL-S 8 + 2 (ES) | D9.5 CFL-S 8 + 2 (ES) |
| Processor VR | Current D9 Design | Current D9 Design | BOM Change from D9 (~$1.00) |
| Platform Load Line VR Capability | 2.1 mΩ PL2: 122 W; PL4: 159 W ICCmax: 133A | 2.1 mΩ PL2: 122 W; PL4: 159 W ICCmax: 133A | 1.6 mΩ PL2: 122 W; PL4: 159 W ICCmax: 133A |
| Tau setting | Tau = 8 | Tau = 8 | Tau = 8 |
| Cinebench Score | 1298 | 1505 | 1535 |

Table 1 above shows a 2% performance increase with processor VR BOM change as compared to the Cinebench result. Table 1 also shows that there is a performance increase when comparing the processor drop-in on an unchanged motherboard versus using with a motherboard according to the present embodiments where the platform load line resistance may be adjusted for the new processor.

Figure 3:
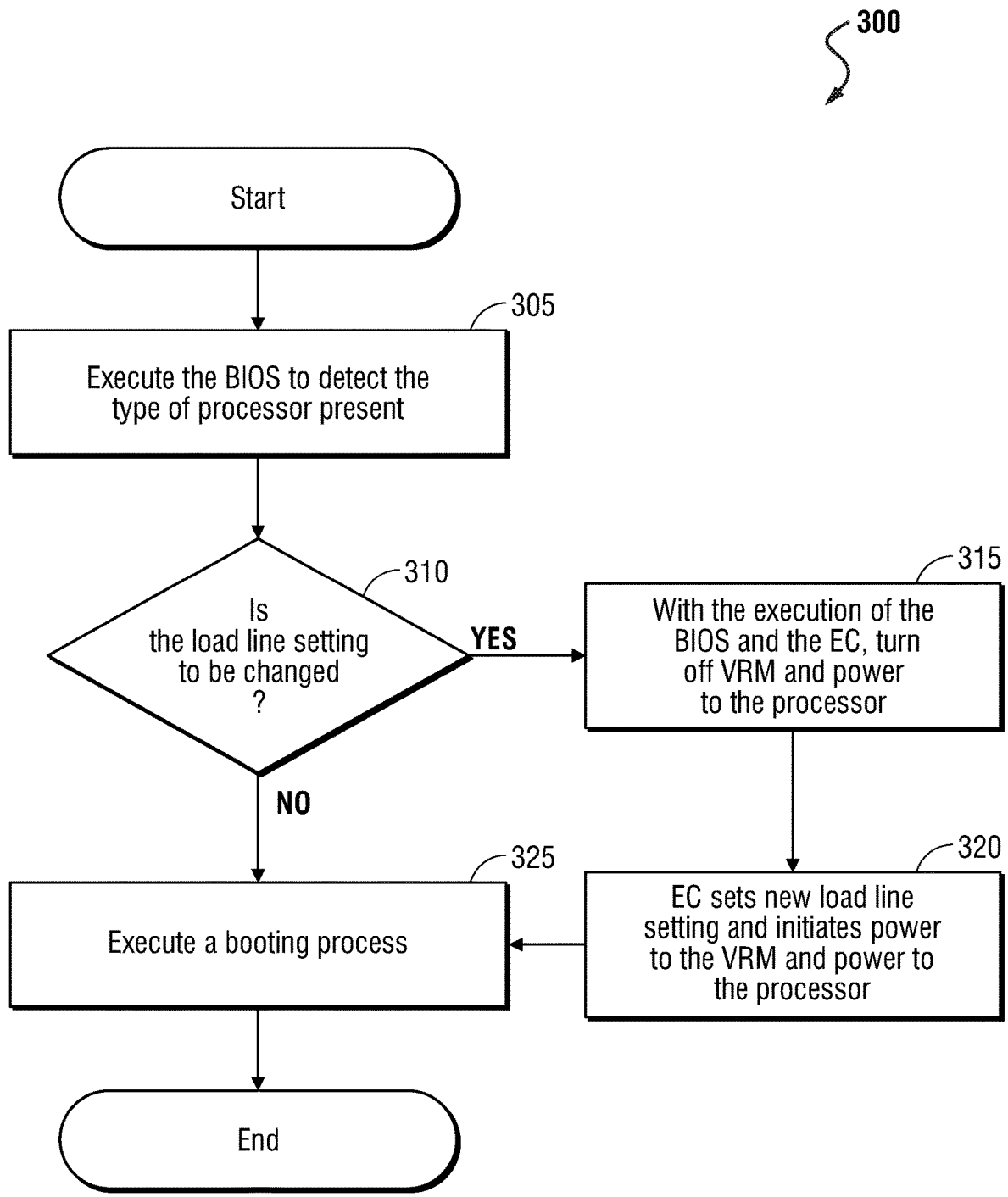
FIG. 3 is a flow diagram illustrating a method of modifying a load line setting via a flexible motherboard according to an embodiment of the present disclosure.

FIG. 3 is a flow diagram illustrating a method 300 of detecting a change to a load line setting to be made according to an embodiment of the present disclosure. The method 300 may begin at block 305 with executing the BIOS of the information handling system to detect the type of processor present. The BIOS may do this by executing an IA32 CPUID instruction set to retrieve information related to the installed processor (e.g., generation and load line settings) attached on motherboard. The processor type identification is forwarded from the BIOS to an EC.

At block 310, it may be determined whether the load line setting currently implemented at the information handling system should be changed. The load line settings should be changed when the EC, upon the receipt of the processor information, determines that the currently-installed processor does not match the load line setting currently set (for example as a default setting). Where it is determined that the load line setting should not be changed (NO determination, block 310), the method 300 may proceed at block 325 with executing a booting process to place the information handling system in operation for use by the user. The EC may communicate with the BIOS to confirm that the booting process is or has been initiated or may not interrupt the boot processes of the BIOS in various embodiments. At this point the method 300 may end.

Where it is determined that the load line setting should be changed (YES determination, block 310), the method 300 may proceed at block 315 with turning off the VRM and removing power to the processor. In an embodiment, the VRM may be turned off and power removed by the processor using the EC upon execution of the BIOS receiving a boot interrupt signal form the EC in an example embodiment. This may be done in order to prevent damage to the processor as well as prepare for the setting of the load line. At block 320, the EC may set a new load line setting and initiate power to the VRM and power to the processor. In a specific embodiment, this is done using a resistor divider that includes three resistors to provide a secondary load line resistance level for regulated power supply to the processor. In this embodiment, a switch, such as one or more MOSFET switches, may selectively and operatively couple the resistor divider to at least one additional resistor in order to provide at load line resistance level to accommodate power requirement ranges of the second type of processor. In an embodiment, the switch only changes the characteristics of the resistor divider when instructed to do so by the EC. At this point the method 300 may end.

It is appreciated that the method 300 described in connection with FIG. 3 may be repeated when a user actuates a power button in order to turn on the information handling system but often will only be initiated upon first boot up after manufacture of the information handling system or upon repair or replacement of a CPU. In an embodiment, the user may execute, for example, a diagnostic process in order to initiate the method 300 of FIG. 3.

Figure 4:
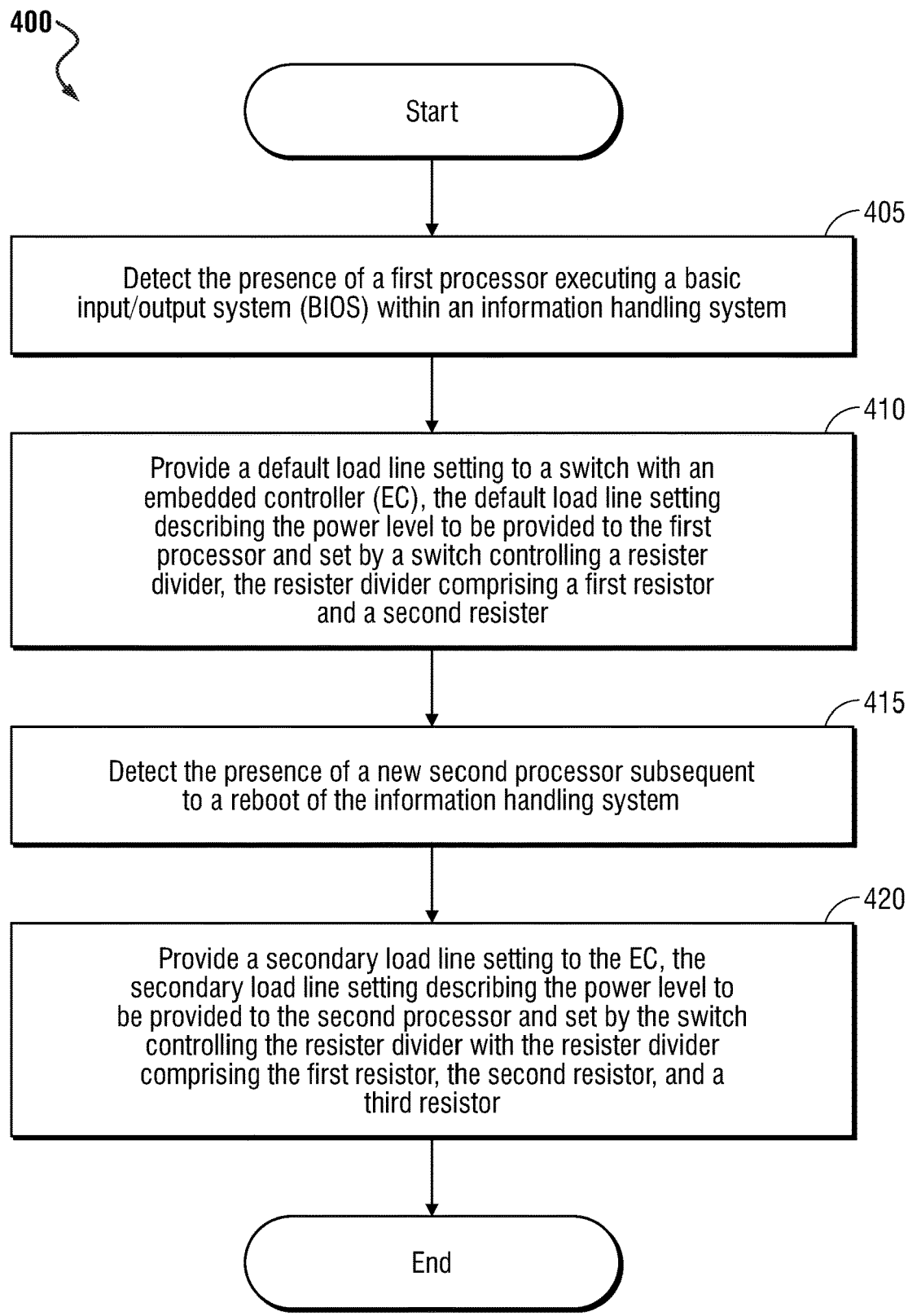
FIG. 4 is a flow diagram illustrating a method of switching load line settings for modulating power to a processor a via a voltage regulator module (VRM) according to an embodiment of the present disclosure.

FIG. 4 is a flow diagram illustrating a method 400 of switching load line settings for modulating power to a processor via a VRM according to an embodiment of the present disclosure. The method 400 may include, at block 405, with the detection of the presence of a first type of processor executing a BIOS within an information handling system. The BIOS may do this by executing an IA32 CPUID instruction set to retrieve information related to the installed processor (e.g., generation and load line settings) attached on the motherboard. At this point the method 400 may proceed based on whether a first type of processor is detected or whether a second type of processor is detected.

At block 410 the method 400 may include providing a CPU ID to an embedded controller (EC) to determine a default load line setting for the first type of processor. The default load line setting describes the load line resistance level to be provided to the VRM to modulate power ranges of power supplied to the first type of processor under varying loads and set by a switch controlling a resistor divider. In an embodiment, the resistor divider includes a first resistor and a second resistor that are used to define a power level modulation by the VRM according to the default load line setting. In this embodiment, the default load line setting is provided to the switch using a GPIO signal. Because the default load line setting is associated with an originally-installed processor the EC may send a GPIO signal to the switch indicating that, that an "LL Config-1" is to be set. "LL Config-1" defines which resistors within the resistor divider (e.g., $R_1$ and $R_n$ of FIG. 2) are to be used to maintain this "default" load line setting.

The method 400 may further include detecting the presence of a new second type of processor subsequent to a reboot of the information handling system at block 415. In an embodiment, this second type of processor, for example, may have been installed after a repair or upgrade of the information handling system as described herein. In an embodiment, the execution of the BIOS by the EC in order to discover the new second type of processor may be conducted at every power initiation of the information handling system. In an embodiment, the user may execute a diagnostic process that initiates this detection process at block 415.

The method 400 may further include providing a secondary load line setting to the switch by the EC. The secondary load line setting relates to the load line resistance level for the VRM regulated power level to be provided to the second type of processor by the VRM and set by the switch controlling the resistor divider with the resistor divider comprising the first resistor, the second resistor, and a third resistor. The method 400, here, may also include turning power off at the VRM and processor before providing the secondary load line setting to the switch. In a specific embodiment, this may be done at the EC by instructing power to be removed from power rails associated with either of the VRM and processor.

The operation of the switch described at blocks 410 and 420 includes adjusting the number and/or type of the resistors operatively coupled to the VRM by the switch at the resistor divider (e.g., $R_1$, $R_2$, and $R_n$ of FIG. 2). Again, in a specific example, the switch may be placed in an "off" state by the EC such that a default load line setting is maintained when the EC has discovered that the processor is the originally-installed processor. In this "off" state, the switch causes a first resistor (e.g., $R_1$ of FIG. 2) and a second resistor (e.g., $R_n$ of FIG. 2) in series to be implemented as the resistor divider in order to provide a resistance level at a VRM IC to control power at various loads to the processor. The EC may also direct the switch to be placed in an "on" state. In this "on" state, the switch causes any combination of the first resistor (e.g., $R_1$ of FIG. 2), second resistor (e.g., $R_n$ of FIG. 2), and a third resistor (e.g., $R_3$ of FIG. 2) to be implemented as the resistor divider. For example, where the third resistor (e.g., $R_3$ of FIG. 2) is made to be placed serially with the first resistor (e.g., $R_1$ of FIG. 2) and parallel with the second (e.g., $R_n$ of FIG. 2) resistor, the power supplied at the VRM IC to the processor may be adjusted to be within a range per the specification of the new processor (e.g., the second type of processor). Upon switching the load line setting, the EC may initiate a reboot of the BIOS and power may be provided to the processor by the VRM and switch per the appropriate load line setting as described herein.

The analog switch described herein with its resistor divider (e.g., $R_1$, $R_2$, and $R_n$ of FIG. 2) provides for a flexible load line setting on a single PCB (e.g., the motherboard) that supports different load line settings without modification of the BOM on the motherboard or complete replacement of the motherboard when an originally-installed processor is replaced by a new processor, for example. This design of the analog switch that supports at least two different load line settings, therefore, allows for the user to swap out the processor without subjecting the new processor to an inappropriate load line setting and power supply form the VRM. The PWC IC's load line adjustment functions may be implemented without significant added cost during the manufacture of the motherboard and other components of the information handling system. Additionally, the design of the analog switch that supports at least two different load line settings also allows for a manufacturer to build portions of an information handling system in anticipation for a user to customize that build at the time of purchase. Because the motherboard of the manufacturers initial build may have anticipated the use of a first type of processor, the user may otherwise be restricted in the selection of a processor without the analog switch described herein. Instead, with the analog switch placed on the motherboard of the manufacture's build, the user may select a second type of processor (e.g., a newer generation of processor) over the first type of processor without switching out the entire motherboard and without subjecting the second type of processor in the customized build to an inappropriate load line setting and power supply.

The blocks of the flow diagrams of FIGS. 3 and 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system with a flexible motherboard system, comprising:
   a processor;
   a memory;
   a voltage regulator module (VRM) coupled to the processer and a power source;
   an embedded controller (EC) operatively coupled to the VRM to execute code to correlate detecting a first type of processor installed with a load line resistance level to allow for installation or upgrade among plural types of processors;
   the power source to provide power to the first type of processor, memory, and EC; and
   the EC being operatively coupled to a switch that is operatively coupled to a resistor divider circuit comprising a first resistor and a second resistor for setting a load line resistance level to the VRM in a first switched state; and
   a general-purpose input/output (GPIO) input pin operatively coupled between the EC and the switch to transmit a signal from the EC to switch the switch to set the load line resistance level provided to the VRM based on power requirements of the first type of processor installed as detected by a basic input/output system (BIOS).

2. The information handling system of claim 1, further comprising the BIOS to, via an IA32 CPUID instruction set, identify to the EC the presence of the first type of processor within the information handling system for the EC to define the resistance level for output of the GPIO to the switch to control the load line resistance level for the first type of processor.

3. The information handling system of claim 1, further comprising the VRM placed intermediary to the processor and the switch to:
   regulate power levels to the processor under varying loads; and
   adjust the regulated power level based on load line resistance levels according to the operation of the resistor divider and switch for the first type of detected processer.

4. The information handling system of claim 1, further comprising a third resistor of the resistor divider operatively coupled to the switch and activated to adjust the load line resistance level setting associated with a second type of processor detected by a BIOS of the information handling system in a second switched state.

5. The information handling system of claim 1, wherein the resistor divider defines a default load line resistance level setting associated with the first type of processor.

6. The information handling system of claim 1, wherein the signal from the EC to reset the load line resistance level further directs a VRM placed intermediary to the first processor and the switch to be powered down before adjusting the load line resistance level.

7. The information handling system of claim 1 wherein the switch includes a metal-oxide-semiconductor field-effect transistor (MOSFET) for adjusting the load line resistor level setting via adjustment to the resistor divider.

8. A method of modifying a load line setting associated with a processor of an information handling system with a flexible motherboard system, comprising:
   initiating power at the information handling system to power the processor, a voltage regulator module (VRM), a memory, and an embedded controller (EC);
   with execution of a basic input/output system (BIOS), detecting a first type of processor within the information handling system from among a plurality of candidate types of processors;
   accessing a table maintained in the memory, via the EC executing code instructions, to determine a load line setting to be associated with the first type of processor detected as installed in the information system; and
   where the load line setting to be associated with the first type of processor is to be changed:
      powering down the processor and VRM;
      with the EC, via a general-purpose input/output (GPIO) output pin, transmitting a signal to a switch operatively coupled to the EC and the VRM, the EC to switch the switch with the signal to set a load line resistance level provided to the VRM based on power requirements of the first type of processor installed as detected by the basic input/output system (BIOS); and with the switch, adjusting a resistor divider coupled to the switch to set the load line resistance level provided to the VRM based on power requirements of the first type of processor installed as detected by the basic input/output system (BIOS).

9. The method of claim 8, further comprising:
regulating power levels with the VRM to the processor under varying loads; and
adjusting the regulated power level based on load line resistance levels to the VRM according to the operation of the resistor divider and switch for the first type of detected processer.

10. The method of claim 8 further comprising:
with the basic input/output system (BIOS) detecting the first type of the processor via an IA32 CPUID instruction set.

11. The method of claim 8 further comprising:
a resistor divider including a first resistor and a second resistor; and
adjusting the resistor divider includes adjusting a number of resistors coupled to the resistor divider includes operatively coupling a third resistor in parallel to the second resistor via the switch to adjust the load line resistance level to the VRM.

12. The method of claim 8 further comprising:
setting a first load line resistance level to the first type of processor using a first configuration of resistors forming the resistor divider; and
setting a second load line resistance level to a second type of processor using a second configuration of resistors forming the resistor divider.

13. The method of claim 8, wherein the switch includes a metal-oxide-semiconductor field-effect transmitter (MOSFET) to adjust the resistor divider.

14. A method of switching load line settings for modulating power to a processor installed in a flexible motherboard system, comprising:
detecting the presence of a first type of processor installed in the flexible motherboard from a plurality of candidate types of processors via executing a basic input/output system (BIOS) within an information handling system;
providing a default load line setting to a switch in a first switched state via a signal from an embedded controller (EC), the default load line setting determining a first load line resistance level to be provided to the VRM powering the first type of processor, the first load line resistance level set by the switch controlling a resistor divider including a first resistor and a second resistor;
detecting, via execution of the BIOS, the presence of a second type of processor subsequent to a reboot of the information handling system;
providing a secondary load line setting to the switch by a signal from the EC to switch the switch to a second switched state, the secondary load line setting determining a second load line resistance level to be provided to the VRM powering the second type of processor, the second load line resistance level set by the switch controlling the resistor divider including the first resistor, the second resistor, and a third resistor in parallel with the second resistor in the resistor divider.

15. The method of claim 14 further comprising:
executing an IA32 CPUID instruction set by the BIOS to detect the presence of the first type of processor or the second type of processor.

16. The method of claim 14 further comprising:
the first resistor and the second resistor placed in series to set the first load line resistance level.

17. The method of claim 14 further comprising:
providing the default load line setting to the switch and providing the secondary load line setting to the switch via a via a general-purpose input/output (GPIO) output pin on the EC.

18. The method of claim 14 further comprising:
powering off the VRM prior to providing the secondary load line setting to the switch.

19. The method of claim 14, wherein the switch comprises a metal-oxide-semiconductor field-effect transistor (MOSFET) operatively coupled to the resistor divider and is placed intermediate to the EC and the VRM.

20. The method of claim 14 further comprising:
providing a third load line setting by adjusting the resistor divider to include a fourth resistor in parallel with the second resistor in the resistor divider via the switch to adjust the load line resistance level to the VRM to a third load line resistance level.

* * * * *